(12) United States Patent
Pelouch

(10) Patent No.: US 7,070,534 B2
(45) Date of Patent: Jul. 4, 2006

(54) POWER TRANSMISSION WITH PRESELECTED RATIOS AND A PRESELECTED OUTPUT SPLITTER

(75) Inventor: Robert J. Pelouch, Martinsville, IN (US)

(73) Assignee: General Motors Corporation, Detroit, MI (US)

( * ) Notice: Subject to any disclaimer, the term of this patent is extended or adjusted under 35 U.S.C. 154(b) by 158 days.

(21) Appl. No.: 10/901,711

(22) Filed: Jul. 29, 2004

(65) Prior Publication Data
US 2006/0025272 A1 Feb. 2, 2006

(51) Int. Cl.
*F16H 37/02* (2006.01)
(52) U.S. Cl. ............... 475/214; 475/207; 475/218; 74/745; 74/331
(58) Field of Classification Search ........... 475/218, 475/214, 207; 74/745, 331
See application file for complete search history.

(56) References Cited

U.S. PATENT DOCUMENTS

| | | | | |
|---|---|---|---|---|
| 3,589,483 A | * | 6/1971 | Smith | 192/3.52 |
| 4,461,188 A | * | 7/1984 | Fisher | 74/330 |
| 5,383,374 A | * | 1/1995 | Reynolds | 74/15.66 |
| 5,492,034 A | * | 2/1996 | Bogema | 74/730.1 |
| 5,823,051 A | * | 10/1998 | Hall, III | 74/325 |
| 5,971,883 A | * | 10/1999 | Klemen | 475/296 |
| 6,056,661 A | * | 5/2000 | Schmidt | 475/210 |
| 2004/0144190 A1 | * | 7/2004 | Hall | 74/331 |

FOREIGN PATENT DOCUMENTS

DE 10037134 A1 * 6/2002

* cited by examiner

*Primary Examiner*—Ha Ho
*Assistant Examiner*—Justin K. Holmes
(74) *Attorney, Agent, or Firm*—Christopher DeVries

(57) ABSTRACT

A power transmission includes a plurality of ratio gear members, a planetary splitter, and a plurality of splitter control gear members. The ratio gear members are divided between two countershafts and two input clutches such that two power paths are provided from the transmission input. The splitter control gear members are disposed on the output of each of the ratio gears to establish input power paths to the planetary splitter, which delivers power to the transmission output shaft. By providing selective engagement of two selectively operable input clutches, a plurality of mechanical clutches and the planetary splitter gearset eight forward speed ratios are provided. A ninth forward ratio is provide by a mechanical clutch directly interconnecting one of the input clutches with the transmission output shaft in bypassing relation to the planetary splitter.

3 Claims, 1 Drawing Sheet

POWER TRANSMISSION WITH PRESELECTED RATIOS AND A PRESELECTED OUTPUT SPLITTER

TECHNICAL FIELD

This invention relates to power transmissions and, more particularly, to power transmissions having preselected speed ratios.

BACKGROUND OF THE INVENTION

Preselected gear ratio transmissions or dual input transmissions, as they are commonly called, have two input clutches selectively connecting separate drive paths between a transmission input and a transmission output. Each of these drive paths has a number of preselectable gear ratios such that when the respective input clutch is disconnected, the on-coming gear ratio can be selected within that drive path. The drive paths are interchanged by dropping the input clutches. The number of gear ratios available with a given set of gear meshes can be increased by employing a splitter gearset, which is commonly a planetary gearset connected between the ratio gears and the transmission output.

Present transmissions using output splitters employ two friction devices to engage and disengage the splitter ratios. However, the use of an output splitter prevents power shifting of the speed ratios when the splitter is being employed unless additional control clutches are added to the transmission.

SUMMARY OF THE INVENTION

It is an object of the present invention to provide an improved power transmission.

In one aspect of the present invention, the power transmission includes a plurality of dual path speed ratios.

In another aspect of the present invention, one of the power paths is controlled by a first input clutch and the other of the power paths is controlled by a second input clutch.

In yet another aspect of the present invention, the power path, which is idle during power transmission, can be preselected to the on-coming ratio prior to the input clutches being interchanged.

In still another aspect of the present invention, an output splitter planetary gearset is incorporated between the speed ratio power path and the transmission output.

In a further aspect of the present invention, the condition of the splitter is preselected prior to its incorporation into the on-coming power path.

In yet still a further aspect of the present invention, both the on-coming speed ratio and the on-coming splitter ratio are preselected in a power path in which the input clutch is currently disengaged.

DESCRIPTION OF AN EXEMPLARY EMBODIMENT

Figures 1, 2:
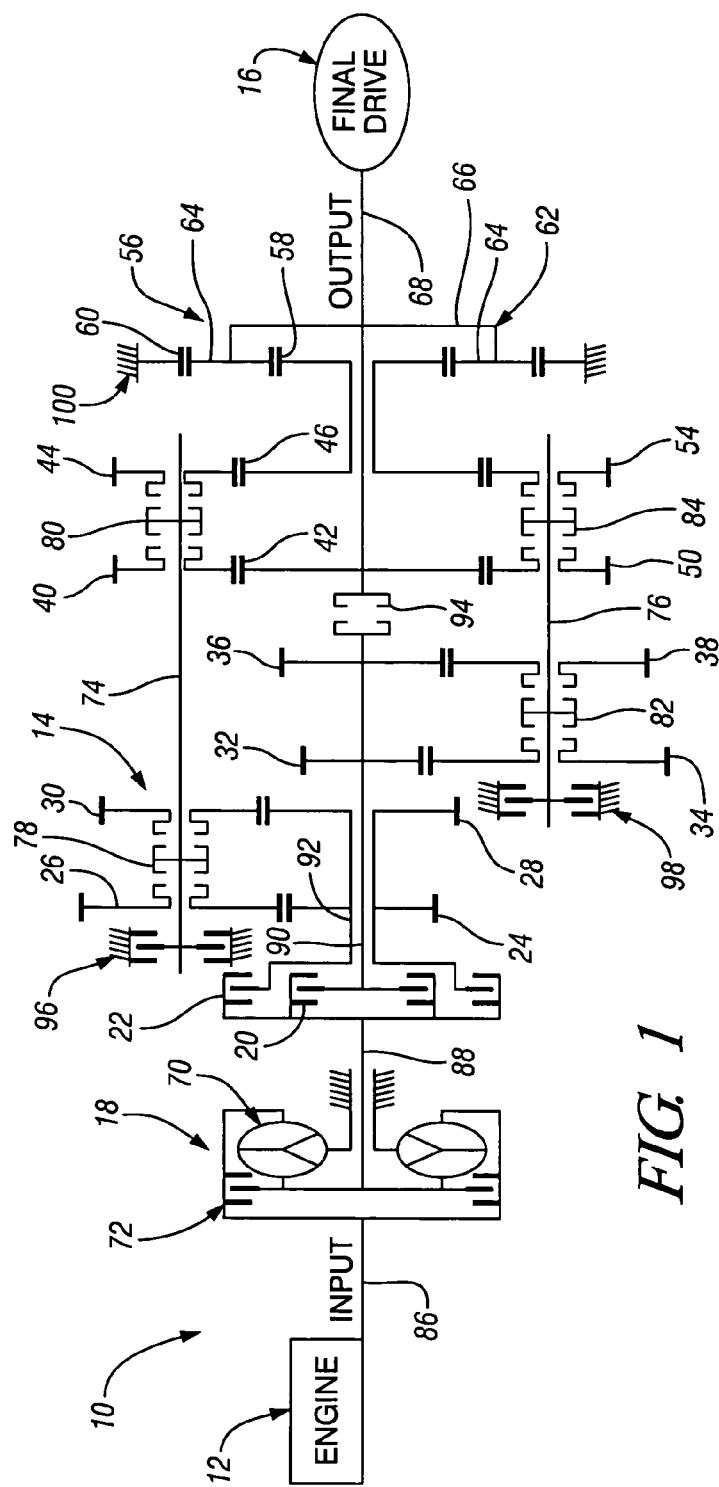
FIG. 1 is a schematic representation of a powertrain incorporating the present invention.
FIG. 2 is a chart describing the engaged condition of the clutches and synchronizers for the schematic representation shown in FIG. 1.

A powertrain 10 includes an engine 12, a dual power path transmission 14, and a conventional final drive mechanism 16. The dual power path transmission 14 has a torque converter and clutch 18, a pair of input power clutches 20 and 22, a first pair of meshing ratio gears 24 and 26, a second pair of meshing ratio gears 28 and 30, a third pair of meshing ratio gears 32 and 34, a fourth pair of meshing ratio gears 36 and 38, a first pair of splitter control gears 40 and 42, a second pair of intermeshing splitter control gears 44 and 46, a third splitter control gear 50 meshes with the gear 42, and a fourth splitter control gear 54 meshes with the gear 46.

A planetary splitter mechanism 56 includes a sun gear member 58 continuously connected with the gear 46, a ring gear member 60 continuously connected with a transmission housing 100, and a planet carrier assembly member 62 having a plurality of pinion gears 64 meshing with the sun gear member 58 and ring gear member 60 and rotatably mounted on a planet carrier member 66. The planet carrier member 66 is continuously connected with the final drive mechanism 16 through a transmission output shaft 68. The torque converter and clutch 18 has a conventional hydrodynamic drive mechanism 70 and a selectively engageable clutch member 72. These are conventional devices well known in the art.

The transmission 14 also has a pair of countershafts 74 and 76. The countershaft 74 rotatably supports the gears 26, 30, 40, and 44 and the countershaft 76 rotatably supports the gears 34, 38, 50, and 54. The gears 26 and 30 are individually selectively connectible with the countershaft 74 through a conventional mechanical clutch 78. The gears 40 and 44 are selectively connectible with the countershaft 74 through a mechanical clutch 80. The gears 34 and 38 are selectively connectible with the countershaft 76 through a conventional mechanical clutch 82. The gears 50 and 54 are selectively connectible with the countershaft 76 through a conventional mechanical clutch 84. The mechanical clutches 78, 80, 82, and 84 are conventional devices well known in the art of transmission design and construction. The most common types of mechanical clutch are jaw clutches and synchronizer clutches.

The torque converter and clutch 18 is continuously drivingly connected with the engine 12 through a power shaft 86. The output of the torque converter and clutch 18 is continuously connected through a converter output shaft 88 with the clutches 20 and 22. Thus, the input side of the clutches 20 and 22 continuously rotate with the output of the torque converter and clutch 18.

The selectively engageable clutch 20 has an output side, which is drivingly connected with a shaft 90. The gear members 32 and 36 are continuously connected for rotation with the shaft 90. The clutch 22 has connected to the output thereof a shaft 92, which is continuously connected with the ratio gears 24 and 28. The clutches 20 and 22 are conventional fluid-operated disc type clutches, the construction and control of which is well known in the art of power transmissions.

A selectively engageable brake 96 is operatively connected with the countershaft 74 and a selectively engageable brake 98 is operatively connected with the countershaft 76. These brake members are selectively engageable devices, which can be utilized to control the rotational speed of the respective countershafts 74 and 76 when the countershaft is not transmitting power from the engine to the output.

With the vehicle in which the powertrain 10 is installed being at rest and the clutches 20 and 22 being disengaged, the mechanical clutch 82 is manipulated to connect the gear 34 with the shaft 76 and the mechanical clutch 84 is manipulated to connect the gear 54 with the shaft 76. The clutch 20 is then selectively engaged to complete a power path from the engine 12 through the gear mesh 32–34, gear mesh 54–46, to the sun gear member 58. The splitter 56 having power applied at the sun gear member 58 introduces a reduction drive between the transmission 14 and the final drive mechanism 16.

While the transmission is operating in the first forward speed ratio, the mechanical clutch 78 is manipulated to engage the gear 26 with the shaft 74 and the mechanical clutch 80 is manipulated to engage the gear 44 with the shaft 74. When it is desired to change the ratio from first to second, the clutches 20 and 22 are interchanged such that power flow from the input or engine 12 to shaft 76 is transferred from the engine 12 to the shaft 74 and thence through the planetary splitter 56 to the output or final drive mechanism 16.

The third forward speed ratio is preselected while the transmission is operating in second gear by manipulating the mechanical clutch 82 to engage the gear 38 with the shaft 76 and the mechanical clutch 84 is manipulated to engage the gear 50 with the shaft 76. When this is accomplished, the clutches 20 and 22 are again interchanged so that power flow is from the engine 12 to the countershaft 76. From the countershaft 76, however, the power flow is directed to the output shaft 68 through the gear 42.

The fourth forward speed ratio is preselected during third ratio operation by manipulating the mechanical clutch 78 to engage the gear 30 with the shaft 74 and the mechanical clutch 80 is manipulated to engage the gear 44 with the shaft 74. The clutches 20 and 22 are then interchanged so that power flow is from the engine 12 through the countershaft 74 to the sun gear member 58 and thence a reduction drive through the planetary splitter 56 to the final drive mechanism 16.

While the transmission is operating in the fourth forward speed ratio, the mechanical clutch 82 is manipulated to engage the gear 34 with the countershaft 76 and the mechanical clutch 84 is manipulated to engage the gear 50 with the countershaft 76. By interchanging the clutches 20 and 22, the power flow is disconnected from shaft 74 and connected with shaft 76. The power flow is then from the engine 12 through shaft 76 to the gears 50 and 42 directly to the output shaft 68.

While operating in the fifth forward speed ratio, the sixth forward speed ratio can be preselected on the countershaft 74 by manipulating the mechanical clutch 78 to engage the gear 26 and manipulating the mechanical clutch 80 to engage the gear 40. With this set of engagements, the clutches 20 and 22 are again interchanged such that power flow is from the engine 12 through the shaft 74 to the gear 40 and then through the gear 42 to the final drive mechanism 16.

While operating in the sixth forward speed ratio, the seventh forward speed ratio is preselected by manipulating the mechanical clutch 82 to engage the gear 38 with the shaft 76 and manipulating the mechanical clutch 84 to engage the gear 50 with the shaft 76. The power flow is then transferred to the countershaft 76 by the interchange of the clutches 20 and 22 such that power flow from the engine 12 is directed through the gear mesh 36–38, the gear mesh 50–42, output shaft 68 through the final drive mechanism 16.

During operation in the seventh forward speed ratio, the eighth forward speed ratio can be preselected by manipulating the mechanical clutch 78 to engage the gear 30 and manipulating the mechanical clutch 80 to engage the gear 40. To complete the eighth forward speed ratio, the clutch 20 is disengaged while the clutch 22 is engaged thereby transferring power to the countershaft 74. The power flow during the eighth forward speed ratio is from the engine 12 through the meshing gears 28–30, the meshing gears 40–42, the output shaft 68 through the final drive mechanism 16.

A ninth forward speed ratio is preselected by manipulating a mechanical clutch 94 to connect the shaft 90 directly with the shaft 68. To complete the ninth forward speed ratio power flow, the clutch 20 is engaged while the clutch 22 is disengaged. With this manipulation, the power is directed from the shaft 88 to the shaft 68. This is, of course, a 1:1 drive ratio. The other forward speed ratios are all underdrive ratios.

The above description of ratio changes in an upward direction or increasing speed ratio direction can, of course, be reversed during downshifting. For example, if the transmission is operating in the ninth forward speed ratio, the eighth forward speed ratio can be preselected in the same manner as it was preselected for an upshift from seventh. Therefore, when the transmission is operating in any speed range other than ninth or first, the on-coming speed ratio can be either above or below the current operating speed ratio. For example, operating in the fifth forward speed ratio, the operator can preselect either sixth or fourth speed ratio and then complete the shift by interchanging the clutches 20 and 22.

It will be appreciated by those skilled in the art that the transmission is without power interruption during ratio changes in either the upshifting direction or the downshifting direction.

FIG. 2 describes the shift sequence in pictorial format. During each ratio interchange two of the mechanical clutches are moved to a preselect position for each oncoming ratio. The brakes 96 and 98 assist in providing the proper speed for each of the oncoming mechanical clutches during the anticipated ratio upshift. The chart of FIG. 2 also provides an numerical example of ratios that are possible with the above described transmission.

The invention claimed is:

1. A power transmission comprising:
   a power input shaft;
   a first transmission input shaft;
   a second transmission input shaft;
   a first clutch selectively operatively connectible between said power input shaft and said first transmission input shaft;
   a second clutch selectively operatively connectible between said power input shaft and said second transmission input shaft;
   first and second ratio gears drivingly connected with said first transmission input shaft;
   third and fourth ratio gears drivingly connected with said second transmission input shaft;
   a first countershaft;
   a second countershaft;
   fifth and sixth ratio gears rotatably mounted on said first countershaft and meshing with said first and second ratio gears respectively;

first mechanical clutch means for selectively interconnecting said fifth and sixth ratio gears with said first countershaft;
seventh and eighth ratio gears rotatably mounted on said second countershaft;
second mechanical clutch means for selectively interconnecting said seventh and eighth ratio gears with said second countershaft;
a splitter planetary gearset having a first member, a second member continuously connected with a stationary transmission member, and a third member continuously connected with a transmission output shaft;
a first splitter input gear continuously connected with said first member;
a second splitter input gear continuously connected with said third member and said output shaft;
a first splitter control gear meshing with said first splitter input gear and being rotatably mounted on said first countershaft;
a second splitter control gear meshing with said second splitter input gear and being rotatably mounted on said first countershaft;
a third mechanical clutch means for selectively connecting said first and second splitter control gears with said first countershaft;
a third splitter control gear rotatably mounted on said second countershaft;
a fourth splitter control gear rotatably mounted on said second countershaft;
a fourth mechanical clutch means for selectively connecting said third and fourth splitter control gears with said second countershaft;
said first clutch, said first mechanical clutch, and said third mechanical clutch being selectively operable to establish four forward speed ratios between said first transmission input shaft and said transmission output shaft; and
said second clutch, said second mechanical clutch, and said fourth mechanical clutch being operable to establish four forward speed ratios between said second transmission input shaft and said transmission output shaft.

2. The power transmission defined in claim 1 further comprising:
fifth mechanical clutch means selectively operable to connect said first transmission input shaft with said transmission output shaft to establish a direct drive connection between said first input shaft and said output shaft.

3. The power transmission defined in claim 2 further comprising:
said fifth mechanical clutch being operable to connect said first input shaft with said output shaft in bypassing relation to said splitter planetary gearset.

* * * * *